United States Patent
Fu et al.

(10) Patent No.: US 12,408,107 B2
(45) Date of Patent: Sep. 2, 2025

(54) SLICE SELECTION METHOD AND TERMINAL DEVICE

(71) Applicant: GUANGDONG OPPO MOBILE TELECOMMUNICATIONS CORP., LTD., Guangdong (CN)

(72) Inventors: Zhe Fu, Guangdong (CN); Wenqiang Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 401 days.

(21) Appl. No.: 18/070,370

(22) Filed: Nov. 28, 2022

(65) Prior Publication Data
US 2023/0086365 A1    Mar. 23, 2023

Related U.S. Application Data

(63) Continuation of application No. PCT/CN2020/093052, filed on May 28, 2020.

(51) Int. Cl.
*H04W 48/18* (2009.01)
*H04W 36/24* (2009.01)

(52) U.S. Cl.
CPC ......... *H04W 48/18* (2013.01); *H04W 36/247* (2023.05)

(58) Field of Classification Search
CPC .... H04W 48/18; H04W 36/247; H04W 48/20
USPC ................................. 455/436–444; 370/331
See application file for complete search history.

(56) References Cited

U.S. PATENT DOCUMENTS

| | | | |
|---|---|---|---|
| 2018/0262980 A1* | 9/2018 | Jeong | H04W 8/20 |
| 2019/0230584 A1 | 7/2019 | Lou et al. | |
| 2019/0320314 A1 | 10/2019 | Yang | |
| 2019/0357122 A1* | 11/2019 | Li | H04W 48/14 |
| 2022/0394608 A1* | 12/2022 | Luo | H04W 60/00 |

FOREIGN PATENT DOCUMENTS

| | | |
|---|---|---|
| CN | 106572516 A | 4/2017 |
| CN | 107295609 A | 10/2017 |
| CN | 108616959 A | 10/2018 |
| EP | 3257320 A1 | 12/2017 |
| EP | 3531746 A1 | 8/2019 |
| EP | 3537771 A1 | 9/2019 |
| WO | 2017186092 A1 | 11/2017 |
| WO | 2018086060 A1 | 5/2018 |

(Continued)

OTHER PUBLICATIONS

The Extended European Search Report of corresponding European application No. 20937498.2, dated May 25, 2023.

(Continued)

*Primary Examiner* — Michael Y Mapa
(74) *Attorney, Agent, or Firm* — Ladas & Parry, LLP

(57) ABSTRACT

The present application relates to a slice selection method, and a terminal device. The method includes the terminal device receives deployment-related slice information; and the terminal device selects a slice based on the deployment-related slice information. In an embodiment of the present application, based on the deployment-related slice information, an preferred slice can be selected, which reduces access and business service delay for the terminal device.

22 Claims, 4 Drawing Sheets

(56) References Cited

FOREIGN PATENT DOCUMENTS

WO      2019153145 A1    8/2019
WO      2020252281 A1    12/2020

OTHER PUBLICATIONS

International Search Report (ISR) dated Feb. 10, 2021 for Application No. PCT/CN2020/093052.
Written Opinion (WOSA) dated Feb. 10, 2021 for Application No. PCT/CN2020/093052.
The first Office Action of corresponding Chinese patent application No. 202310064458.2 with search report, dated Apr. 16, 2025.

* cited by examiner

SLICE SELECTION METHOD AND TERMINAL DEVICE

CROSS-REFERENCE TO RELATED APPLICATION

This application is a continuation of International Application No. PCT/CN2020/093052, filed on May 28, 2020, which is hereby incorporated by reference in its entirety.

TECHNICAL FIELD

The present application relates to the field of communication and, in particular, to a slice selection method and a terminal device.

BACKGROUND

At present, with the pursuit of rate, delay, high-speed mobility, and energy efficiency, coupled with the diversity and complexity of services in future life, 3GPP (3rd Generation Partnership Project, third generation mobile communication standardization organization) has begun to develop the next generation communication (5th-Generation, 5G). Main application scenarios of 5G involve: enhanced mobile broadband (eMBB), ultra reliability and low latency communication (URLLC), and massive machine type communication (mMTC).

In 5G, network slicing mainly involves a core network side. Specifically, user equipment (UE) reports slicing requirements, and then the network selects a suitable access and mobility management function (AMF) according to the slice reported by the UE, to establish a service session between the UE and the network. However, the UE cannot select the slice, which may cause access and business service delay for the UE.

SUMMARY

Embodiments of the present application provide a slice selection method and a terminal device, which can select a suitable slice.

An embodiment of the present application provides a slice selection method, including:
receiving, by a terminal device, deployment-related slice information; and
selecting, by the terminal device, a slice based on the deployment-related slice information.

An embodiment of the present application provides a terminal device, including:
a receiving unit, configured to receive deployment-related slice information; and
a selection unit, configured to select a slice based on the deployment-related slice information.

An embodiment of the present application provides a terminal device, including: a processor and a memory. The memory is configured to store a computer program, and the processor is configured to call and run the computer program stored in the memory, so that the terminal device executes the above slice selection method.

An embodiment of the present application provides a network device, including: a processor and a memory. The memory is configured to store a computer program, and the processor is configured to call and run the computer program stored in the memory, so that the network device executes the above slice selection method.

An embodiment of the present application provides a chip which is configured to implement the above slice selection method.

Specifically, the chip includes a processor configured to call and run a computer program from a memory, so that a device installed with the chip executes the above slice selection method.

An embodiment of the present application provides a computer-readable storage medium where the computer-readable storage medium is configured to store a computer program which, when run by a device, enables the device to perform the above slice selection method.

An embodiment of the present application provides a computer program product, including computer program instructions that enable a computer to perform the above slice selection method.

An embodiment of the present application provides a computer program which, when run on a computer, enables the computer to perform the above slice selection method.

The embodiments of the present application may, based on the deployment-related slice information, select a suitable slice, thereby reducing access and business service delay for the terminal device.

DESCRIPTION OF EMBODIMENTS

Figure 1:
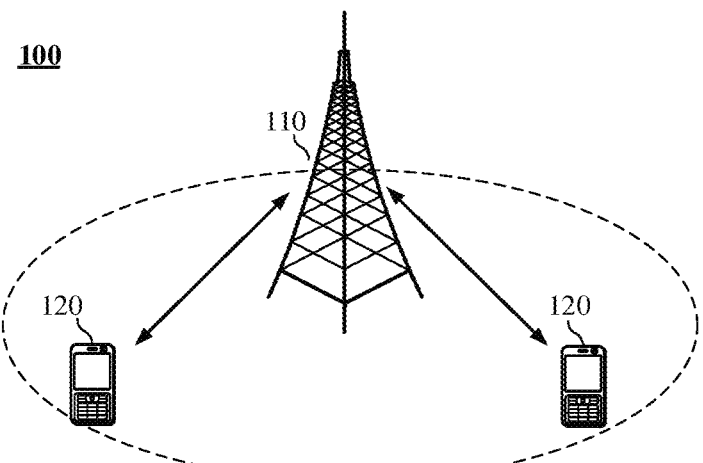
FIG. 1 is a schematic diagram of an application scenario according to an embodiment of the present application.

Technical solutions in embodiments of the present application will be described below in conjunction with accompanying drawings in the embodiments of the present application.

The technical solutions of the embodiments of the present application can be applied to various communication systems, such as: a global system of mobile communication (GSM) system, a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, a NR evolution system, a LTE-based access to unlicensed spectrum (LTE-U) system, a NR-based access to unlicensed spectrum (NR-U) system, a universal mobile telecommunication system (UMTS), wireless local area networks (WLAN), a wireless fidelity (Wi-Fi), the next-generation (5th-Generation, 5G) system or other communication systems.

Generally, a traditional communication system supports a limited number of connections, which is easy to implement. However, with the development of communication technology, the mobile communication system will not only support traditional communication, but will also support, for example, device to device (D2D) communication, machine to machine (M2M) communication, machine type communication (MTC), and vehicle to vehicle (V2V) communication, etc., to which the embodiments of the present application can also be applied.

In an implementation, the communication system in the embodiment of the present application may be applied to a carrier aggregation (CA) scenario, a dual connectivity (DC) scenario, or a standalone (SA) scenario.

Frequency spectrum used is not limited in the embodiment of the present application. For example, the embodiments of the present application may be applied to licensed and unlicensed spectrum.

The embodiments of the present application describe various embodiments in conjunction with the network device and the terminal device, in which the terminal device may also be referred to as a user equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc. The terminal device may be a station (ST) in a WLAN, a cellular phone, a cordless phone, a session initiation protocol (SIP) phone, a wireless local loop (WLL) station, a personal digital assistant (PDA) device, a handheld device with wireless communication capabilities, a computing device or other processing devices connected to wireless modems, an on-board device, a wearable device and a next-generation communication system, for example, the terminal device in an NR network or the terminal device in a future evolved public land mobile network (PLMN) network, etc.

By way of example and not limitation, in this embodiment of the present application, the terminal device may also be a wearable device. The wearable device can also be called a wearable smart device, which is a general term of wearable devices developed by intelligently designing daily wear based on wearable technology, such as glasses, gloves, watches, clothing and shoes. The wearable device is a portable device that is directly worn or integrated into user's clothing or accessories. The wearable device is not only a hardware device, but also realizes powerful functions through software support, data interaction, and cloud interaction. The wearable smart device in a broad sense includes full functions and large size, and can achieve complete or partial functions without relying on a smart phone, such as a smart watch or smart glasses, and only focus on a certain type of application function and needs to be used in conjunction with other devices such as a smart phone, such as various smart bracelets and smart jewelry for monitoring physical signs.

The network device may be a device for communicating with the mobile device, and the network device may be an access point (AP) in WLAN, a base transceiver station (BTS) in GSM or CDMA, or a NodeB (NB) in WCDMA, or an evolutional Node B (eNB or eNodeB) in LTE, or a relay station or an access point, or an on-board device, a wearable device, and a network device (gNB) in the NR network or a network device in the future evolved PLMN network, etc.

In the embodiments of the present application, the network device provides services for the cell, the terminal device communicates with the network device through the transmission resources (for example, frequency domain resources, or spectrum resources) used by the cell. The cell may correspond to the network device (for example, a base station), and the cell may belong to a macro base station, or belong to a base station corresponding to a small cell, and the small cell here may include: a metro cell, a micro cell, a pico cell, and a femto cell, etc. These small cells feature small coverage and low transmit power, and are suitable for providing high-speed data transmission services.

FIG. 1 exemplarily shows a communication system 100. The communication system 100 includes one network device 110 and two terminal devices 120. In an implementation, the communication system 100 may include multiple network devices 110, and coverage scope of each network device 110 may include other numbers of terminal devices 120, which are not limited in this embodiment of the present application.

In an implementation, the communication system 100 may further include other network entities such as a mobility management entity (MME), an access and mobility management function (AMF), etc., which are not limited in this embodiment of the present application.

It should be understood that the terms "system" and "network" are often used interchangeably herein. The term "and/or" used herein is only an association relationship describing associated objects, indicating that there can be three kinds of relationships, for example, "A and/or B" can mean: A exists alone, A and B exist at the same time, and B exists alone. In addition, the character "/" used herein generally indicates that the related objects are of an "or" relationship.

The strong demand for wireless communications in the vertical market is obvious to all. In order to meet the demand of the vertical market on delay, mobility, reliability and location accuracy, the radio access network (RAN) is required to enhance: how to support vertical services in the access network. One way is to provide, based on network slicing, lower latency, more targeted, more flexible and more scalable services for multiple services with different requirements. More specifically, RAN slicing can involve the application provider in the design, deployment, and operation of a customized RAN to better support the application provider's business.

Therefore, the enhancement of the slicing by the access network is introduced, which mainly involves the improvement for the network slicing supporting the RAN. The following are taken as examples.

1. a mechanism that enables the UE to quickly access a cell supporting a predetermined slice, including [RAN2].
   a. slice-based cell reselection under network control.
   b. slice-based RACH (random access) configuration or access restriction.

And whether there is a mechanism that can meet this scenario or demand is included.

2. the necessity and the mechanism to support service continuity, including [RAN3].
   a. for intra-RAT (Radio Access Technology) handover service interruption, for example, the target gNB does not support persistent slices, study slice remapping, fallback and data forwarding procedures for the UE. Coordination with SA2 is required.

In the related art, regarding the slicing identification, the RAN side defines single network slice selection assistance information (S-NSSAI) for each slice. The UE side maintains NSSAI, which is an S-NSSAI list, and the UE supports up to 8 S-NSSAIs.

S-NSSAI consists of SST (Slice/Service Type) and SD (Slice Differentiator). SST represents the service type, and SD represents different UE groups serving under the same SST.

In the embodiment of the present application, the problem of network slice deployment limitation is taken into consideration. The slice deployment may be related to a factor such as a location, and there are specific slices in a specific deployment. Therefore, consideration of the related mechanism may enable the UE to reasonably select the required slice for the UE, access quickly, and avoid access and service delays for the UE.

Figure 2:
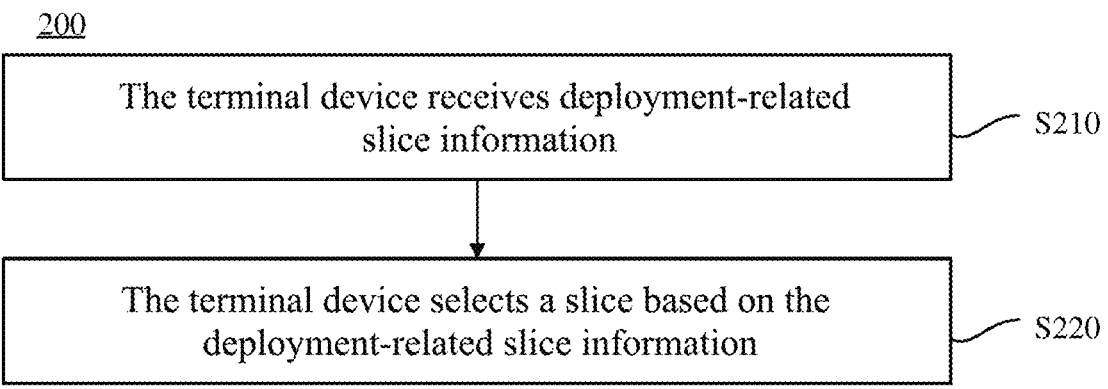
FIG. 2 is a schematic flowchart of a slice selection method according to an embodiment of the present application.

FIG. 2 is a schematic flowchart of a slice selection method 200 according to an embodiment of the present application. The method can optionally be applied to a system shown in FIG. 1, but is not limited thereto. The method includes at least some of the following.

S210, the terminal device receives deployment-related slice information.

S220, the terminal device selects a slice based on the deployment-related slice information.

In this embodiment of the present application, the method further includes:

the terminal device performs, based on the selected slice, at least one of reporting of a required slice, residency, cell selection, cell reselection and protocol data unit (PDU) session establishment.

In this embodiment of the present application, the terminal device receives deployment-related slice information, including:

the terminal device receives first indication information from a network device, where the first indication information includes the deployment-related slice information, and the first indication information is carried by at least one of: broadcast, a dedicated radio resource control (RRC) message, and a non-access stratum (NAS) message.

In this embodiment of the present application, the deployment-related slice information includes at least one of the following:

slice identification;
correspondence between a service and the slice;
correspondence between a frequency band and the slice;
correspondence between an application and the slice;
correspondence between an operator or service provider identification and the slice;
correspondence between a frequency point and the slice;
slice deployment location information;
a cell group or a tracking area (TA) corresponding to a same slice;
a slice supported by this cell; and
a slice supported by a neighboring cell.

In this embodiment of the present application, the slice identification includes at least one of: network slice selection assistance information (NSSAI), single network slice selection assistance information (S-NSSAI), and a network slice identification (NSID).

In this embodiment of the present application, the slice deployment location information includes at least one of the following:

correspondence between a location and the slice;
correspondence between coverage and the slice;
deployment scope or coverage scope of the slice; and
a deployment radius or a coverage radius of the slice.

The correspondence between the coverage and the slice may include the correspondence between the coverage scope of the slice and the slice, the correspondence between the coverage radius of the slice and the slice, the correspondence between the deployment scope of the slice and the slice, the correspondence between the deployment radius of the slice and the slice, etc.

In this embodiment of the present application, the terminal device selects a slice based on the deployment-related slice information, including at least one of the following:

based on the current location and slice deployment location information, the terminal device selects a slice that can be accessed, and determines at least one of: a slice that can be selected or reported, whether a first cell can be selected as a resident cell or a suitable cell, and whether to perform cell reselection;

based on the current location, the slice deployment location information and a required slice, the terminal device determines at least one of: the slice that can be selected or reported, whether the first cell can be selected as the resident cell or the suitable cell, and whether to perform the cell reselection;

based on the required slice and correspondence between a frequency point and the slice, the terminal device determines at least one of: the slice that can be selected or reported, the frequency point to be selected for residency or a cell corresponding to which frequency point to be selected, whether the first cell can be selected as the resident cell or the suitable cell, and whether to perform the cell reselection;

based on the required slice and the correspondence between the frequency band and the slice, the terminal device determines at least one of: the slice that can be selected or reported, the frequency band to be selected for residency or the cell corresponding to which frequency band to be selected, whether the first cell can be selected as the resident cell or the suitable cell, and whether to perform the cell reselection;

based on required service and correspondence between the service and the slice, the terminal device selects the slice corresponding to the required service, and determines at least one of: the slice that can be selected or reported, whether the first cell can be selected as the resident cell or the suitable cell, and whether to perform the cell reselection;

based on a required application and correspondence between the application and the slice, the terminal device selects the slice corresponding to the required application, and determines at least one of: the slice that can be selected or reported, whether the first cell can be selected as the resident cell or the suitable cell, and whether to perform the cell reselection;

based on the required slice, the slice supported by this cell and the slice supported by a neighboring cell, the terminal device determines at least one of: the slice that can be selected or reported, whether the first cell is selected as the resident cell or the suitable cell, and whether to perform the cell reselection; and based on the required slice, the correspondence between the operator or the service provider identification and the slice, the terminal device determines at least one of: the public land mobile network (PLMN) to be selected, the slice that can be selected or reported, whether the first cell can be selected as the resident cell or the suitable cell, and whether to perform the cell reselection.

In an implementation, if the current slice is not the slice required by the terminal device, the UE in the cell corresponding to this slice can only be provided with limited services.

In this embodiment of the present application, the method further includes: the terminal device receives slice priority information and/or slice selection weight.

In this embodiment of the present application, the terminal device receives the slice priority information and/or the slice selection weight includes:

the terminal device receives second indication information from a network device, where the second indication information includes the slice priority information and/or the slice selection weight, and the second indication information is carried by at least one of: broadcast, a dedicated RRC message and a NAS messages.

In this embodiment of the present application, the slice priority information corresponds to at least one of: information of a serving cell, information of other cells, information of a PLMN, and information of an operator or a service provider; or, the slice selection weight corresponds to at least one of: the information of the serving cell, the information of other cells, the information of the PLMN, and the information of the operator or service provider.

In this embodiment of the present application, the terminal device selects the slice based on the deployment-related slice information includes:

the terminal device selects the slice based on the deployment-related slice information and slice priority information and/or slice selection weight from a network device.

In this embodiment of the present application, in a case where the network device supports multiple slices in a same deployment, the terminal device selects a preferred slice according to slice priority information or slice selection weight from a network device.

In the embodiment of the present application, the method further comprises: the terminal device reports multiple required slices, so that a network device provides slicing services for the terminal device based on load, the slice priority information or the slice selection weight.

In this embodiment of the present application, the method further includes: the terminal device obtains at least one of: slice priority rule, slice selection weight, interest, and preference of the terminal device.

Exemplarily, the slice priority rule may include priorities corresponding to multiple slices that can be selected by the terminal device. For example, slice A has the highest priority, slice B has the lowest priority, and slice C has a priority between the priority of the slice A and the priority of the slice B, and the terminal device selects the slice A with the highest priority.

The slice selection weight may include the weights corresponding to multiple slices that can be selected by the terminal device. For example, in the case the weight corresponding to the slice A is 0.2, the weight corresponding to the slice B is 0.5, and the weight corresponding to the slice C is 0.3, the terminal device selects the slice B with the maximum weight.

The interest may include that when multiple slices are available for selection, the terminal device has different demands for services corresponding to different slices.

The preference may include that when multiple slices are available for selection, the terminal device has different priorities or weights for services selection corresponding to different slices.

In this embodiment of the present application, the method further includes:

the terminal device receives third indication information from a network device, where the third indication information is used to indicate whether the terminal device is allowed to select the slice according to at least one of: a slice priority rule, slice selection weight, interest and preference of the terminal device, and the third indication information is carried by at least one of: broadcast, a dedicated RRC message, and a NAS message.

In this embodiment of the present application, the method further includes:

the terminal device determines, according to the third indication information, whether to select the slice according to at least one of: the slice priority information, the slice selection weight, the interest and the preference of the terminal device.

If the third indication information indicates that the terminal device can select the slice according to its rules, the terminal device can use its rules to select the slice when its rules conflict with the rules of the network side.

In this embodiment of the present application, at least one of the slice priority information, the slice selection weight, the interest and the preference of the terminal device is obtained by access stratum (AS) of the terminal device from non-access stratum of the terminal device, or is determined by the access stratum. For example, the access stratum (AS) of the terminal device receives its slice priority rules from its non-access stratum (NAS). For another example, the access stratum (AS) of the terminal device determines its slice selection weight.

In this embodiment of the present application, the method further includes:

the terminal device selects the slice based on the deployment-related slice information, slice priority information and/or slice selection weight from a network device, and at least one of the slice priority information, the slice selection weight, the interest and the preference of the terminal device.

In this embodiment of the present application, the method further includes:

if the terminal device determines, according to at least one of the slice priority information, the interest and the preference of the terminal device, that slice priority information from a network device is different from the slice priority information of the terminal device, the terminal device selects a preferred slice according to the slice priority information of the terminal device.

For example, if the slice A has the highest priority based on the slice priority information from the network device, but the slice C has the highest priority based on its slice priority information, the terminal device may select the slice C.

In this embodiment of the present application, the method further includes:

if the terminal device determines, according to at least one of the slice priority information, the interest and the preference of the terminal device, that slice selection weight from a network device is different from the slice selection weight of the terminal device, the terminal device selects a preferred slice according to the slice selection weight of the terminal device.

For example, if the slice A has the highest selection weight based on the slice selection weight from the network device, but the slice B has the highest selection weight based on its slice priority information, the terminal device may select the slice B.

In this embodiment of the present application, in a case where the network device supports multiple slices in a same deployment, the terminal device selects a preferred slice according to at least one of: the slice priority information, the slice selection weight, the interest and the preference of the terminal device.

In this embodiment of the present application, the terminal device determines that whether the multiple slices are supported in the same deployment based on the deployment-related slice information. If yes, the terminal device can select the preferred slice according to the slice priority information or slice selection weight from the network device, or can select the preferred slice according to at least one of the slice priority information, the slice selection weight, the interest and the preference of the terminal device.

Example I

The UE receives the deployment-related slice information indicated by the network. The UE further receives the slice priority information indicated by the network, or the slice selection weights of different slices. The UE selects a slice based on the deployment-related slice information and/or slice priority information. Then, at least one of residency, reporting of the required slice, cell selection, cell reselection and PDU session establishment is performed. Further, when the UE reports multiple slice requirements, the network provides slice services for the UE based on factors like load, slice priority information and slice selection weight.

The specific process of this example is as follows.

S1, the UE receives the deployment-related slice information indicated by the network. For example, the UE receives the deployment-related slice information broadcast by the serving cell.

Exemplarily, the deployment-related slice information may include at least one of the following:
(1) a slice identification, for example, the slice identification includes: at least one of NSSAI, S-NSSAI and NSID;
(2) correspondence between the service and the slice;
(3) correspondence between the frequency band and the slice;
(4) correspondence between the application and the slice;
(5) correspondence between the operator/service provider identification (for example, the PLMN, a CAG (Closed Access User Group) identification) and the slice;
(6) correspondence between the frequency point and the slice;
(7) correspondence between the location (for example, the geographic area geographic area) and the slice;
(8) the deployment scope of the slice, the deployment radius of the slice, the coverage area of the slice or the coverage radius of the slice;
(9) correspondence between the coverage (for example, the coverage of the slice and the coverage radius of the slice) and the slice;
(10) the cell group or track area (TA) corresponding to the same slice; and
(11) the slice supported by this cell and the slice supported by the neighboring cell.

The above (7) to (9) may be referred to as slice deployment location information.

The above deployment-related slice information may include the slice supported by the serving cell, and may further include the slice supported by other cells.

The above deployment-related slice information may be indicated in broadcast, the dedicated RRC message or the NAS message, etc. An example of the dedicated RRC message is an RRC release message. The example of a NAS message is a registration message.

S2, the UE receives the slice priority information, indicated by the network, and/or the slice selection weight. This step is optional. The slice priority information may also be referred to as the slice priority rule.

The slice priority information or the slice selection weight may correspond to at least one of the information of the serving cell, the information of other cells, the information of the PLMN, and the information of the operator or service provider.

S3, the UE selects a slice based on the deployment-related slice information and/or the slice priority (selection weights of different slices) information. Further, at least one of the residency, reporting of the required slice, cell selection, cell reselection and PDU session establishment is performed.

The following are taken as examples.

(1) The UE selects an accessible slice based on the current location and the slice deployment location information (such as the correspondence between the location and the slice), and requests or establishes a PDU session corresponding to the slice. Alternatively, the required slice can also be reported.

(2) The UE determines, based on the current location and the slice deployment location information (such as the correspondence between the location and the slice) and the required slice, whether the cell can be selected (for example, determines whether to select the cell as a resident cell or a suitable cell).

(3) The UE determines the cell corresponding to which frequency point or to which frequency band to be selected, based on the required slice, the correspondence between the frequency point and the slice, or the correspondence between the frequency band and the slice.

(4) The UE selects, based on the required service and the correspondence between the service and the slice, the corresponding slice, for reporting, or selecting a cell for residence, or establishing a PDU session.

(5) The UE selects, based on the required application and the correspondence between the application and the slice, the corresponding slice, for reporting, or selecting as the cell for residence, or establishing a PDU session.

(6) The UE determines, based on the required slice, the slice supported by the current cell, and the slice supported by the neighboring cell, whether to select the cell and whether to perform cell reselection.

(7) The UE determines, based on the required slice, the correspondence between the operator/service provider identification (such as PLMN, CAG identification) and the slice, the PLMN to be selected. Alternatively, the UE further determines whether to select the cell, or whether to perform the cell reselection.

(8) The UE determines, based on the corresponding relationship between the frequency point and the slice, or the corresponding relationship between the frequency band and the slice, the cell corresponding to which frequency point or to which frequency band to be selected.

Further, more than any of the above, if multiple slices supported by the network are available in the same deployment, the UE can select the preferred slice based on the slice priority information or the selection weights of different slices.

S4, if the UE reports multiple required slices, the network provides a slice service for the UE based on at least one of factors such as load, slice priority information and slice selection weight. Correspondingly, for the selected slice, a corresponding PDU session is established.

Figure 3:
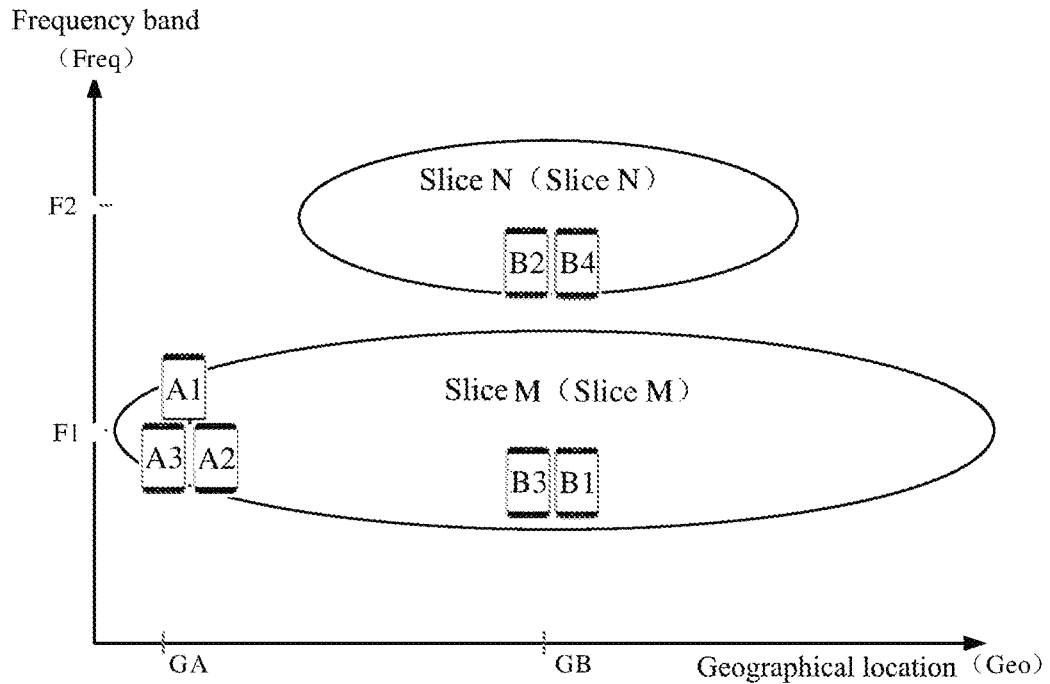
FIG. 3 is a schematic diagram of residency in slice selection results.

As shown in FIG. 3, an example of residency based on the slice selection result is as follows.

UE A1 and UE B1 reside in a frequency band F1, and the frequency band F1 provides a slice M for the UE A1 and the UE B1.

UE A2 resides in the frequency band F1, but the UE A2 requires a slice N, and at this point, the UE A2 is only provided with a limited service.

UE B2 resides in a frequency band F2, and the frequency band F2 provides the slice N for the UE B2.

UE A3 resides in the frequency band F1, and the frequency band F1 provides the slice M for the UE A3.

UE B3 is located under the frequency band F1 and the frequency band F2. Since the UE B3 prefers the slice M, the UE B3 resides in the frequency band F1, and the frequency band F1 provides the slice M for the UE B3.

UE B4 is located under the frequency band F1 and the frequency band F2. Since the UE B4 prefers the slice N, the UE B4 resides in the frequency band F2, and the frequency band F2 provides the slice N for the UE B4.

In the slice selection method in this embodiment, the UE can select the slice based on the deployment-related slice information, to report the required slice, or for residency (for example, to perform cell selection/reselection), so that the UE can select a suitable slice for access.

Example II

The UE receives the deployment-related slice information indicated by the network. The UE further receives the slice priority information indicated by the network, or the selection weights of different slices. The UE selects the slice based on the deployment-related slice information and/or slice priority information. Then, at least one of residency, reporting of the required slice, cell selection, cell reselection and PDU session establishment is performed. Further, in the case more than one slice is supported in the same deployment, the UE further selects the slice based on the slice priority information, the slice selection weight, or the interest or the preference of the UE, and performs at least one of residency, the reporting of the required slice, the cell selection, and the cell reselection and the PDU session establishment. Correspondingly, the UE receives network indication information, which is used to indicate whether the UE is allowed to follow the slice priority information, or the interest or the preference of the UE.

The specific process of this example is as follows:

S1, the UE receives the deployment-related slice information indicated by the network. For example, the UE receives the deployment-related slice information broadcast by the serving cell. Specifically:

Exemplarily, the deployment-related slice information may include at least one of the following:
(1) slice identification, for example, the slice identification includes: at least one of NSSAI, S-NSSAI and NSID;
(2) correspondence between the service and the slice;
(3) correspondence between the frequency band and the slice;
(4) correspondence between the application and the slice;
(5) correspondence between the operator/service provider identification (for example, PLMN, CAG identification) and the slice;
(6) correspondence between the frequency point and the slice;
(7) correspondence between the location (for example, the geographic area geographic area) and the slice;
(8) the deployment scope of the slice, the deployment radius of the slice, the coverage scope of the slice or the coverage radius of the slice;
(9) correspondence between the coverage (for example, the coverage scope of the slice and the coverage radius of the slice) and the slice;
(10) the cell group or the track area (TA) corresponding to the same slice; and
(11) the slice supported by this cell and the slice supported by the neighboring cell.

The above (7) to (9) may be referred to as slice deployment location information.

The above deployment-related slice information may include the slice supported by the serving cell, and may further include the slice supported by other cells.

The above deployment-related slice information may be indicated in broadcast, the dedicated RRC message or the NAS message, etc. An example of the dedicated RRC message is an RRC release message. The example of a NAS message is a registration message.

S2, the UE receives the slice priority information indicated by the network (such as gNB) and/or the slice selection weight. This step is optional.

The slice priority information or the slice selection weight may correspond to at least one of the information of the serving cell, the information of other cells, the information of the PLMN, and the information of the operator or provider.

S3, the UE selects the slice based on the slice priority information or the interest or the preference of the UE, and then resides or reports the required slice. Specifically, the following exemplary cases are included.

Figure 4:
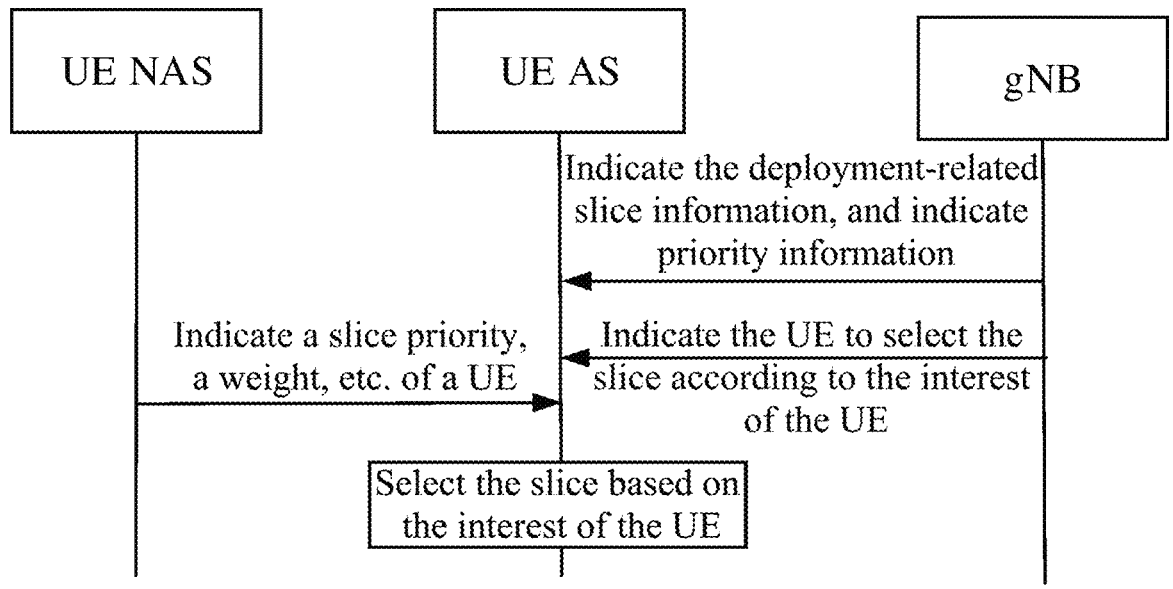
FIG. 4 is a schematic diagram showing UE obtaining its rules.

(1) The slice priority information, the slice selection weight, the interest or the preference of the UE may be given to the UE AS by the UE NAS, or may be determined by the UE AS, as shown in FIG. 4.

(2) More than one slice is supported in the same deployment. The UE selects the slice based on slice priority information, the interest or the preference of the UE, and then, at least one of the residency, the reporting of the required slice, the cell selection, the cell reselection and the PDU session establishment is performed.

(3) The UE determines, according to the deployment-related slice information in S1, whether more than one slice is supported in the same deployment.

(4) The UE determines, according to the network indication information, whether the slice can be selected according to the slice priority information, the slice selection weight, the interest or the preference of the UE. For example, the UE receives network indication information which is configured to indicate whether the UE is allowed to select the slice according to the slice priority information, the interest or the preference of the UE. The indication information may be indicated in broadcast, the dedicated RRC (such as RRC release), or the NAS message (such as Registration message).

(5) More than one slice is supported in the same deployment. The UE selects the slice based on the slice priority information, the slice selection weight, the interest or the preference of the UE, and then, at least one of the residency, the reporting of the required slice, the cell selection, the cell reselection and the PDU session establishment is performed. If the slice selection weights of the UE, for a slice 1 and a slice 2, are 3 and 7, the UE selects slice 2 according to its rules.

(6) If the slice priority information is indicated by the network, at the same time, the UE also has its own the slice priority information, and based on the slice priority information, the interest or the preference of the UE, the slice priority information of the UE is different from the slice priority information indicated by the network; for example, for the slice 1 and the slice 2, the priority indicated by the network for slice 1 is higher than that for slice 2, while from the UE, the priority for slice 2 is higher than that for slice 1; then the UE selects slice 2 according to its rules.

(7) If the selection weights of different slices are indicated by the network, at the same time, the UE also has its own selection weights of different slices, and based on the slice priority information, the interest or the preference of the UE, the selection weights of different slices of the UE are different from those indicated by the network. For example, for the slice 1 and the slice 2, the slice selection weights indicated by the network are 5 and 2, while the slice selection weights from the UE are 3 and 7; then the UE selects the slice 2 according to its rules.

In this embodiment, the UE may select a way of slicing or residing based on the slice priority information, the slice selection weight, the interest or the preference of the UE. In this way, the flexibility of slicing selection is improved, the UE has more autonomy, and the randomization of slice selection or access is objectively realized.

Figure 5:
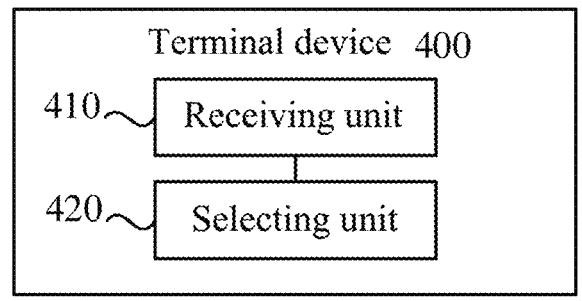
FIG. 5 is a schematic block diagram of a terminal device according to an embodiment of the present application.

FIG. 5 is a schematic block diagram of a terminal device 400 according to an embodiment of the present application. The terminal device 400 may include:
  a receiving unit 410, configured to receive deployment-related slice information;
  a selecting unit 420, configured to select a slice based on the deployment-related slice information.

Figure 6:
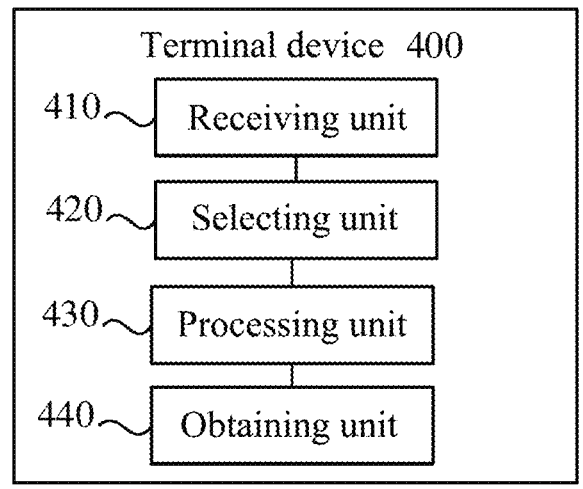
FIG. 6 is a schematic block diagram of a terminal device according to an embodiment of the present application.

In this embodiment of the present application, as shown in FIG. 6, the terminal device further includes:
  a processing unit 430, configured to perform, based on a selected slice, at least one of reporting of a required slice, residency, cell selection, cell reselection and protocol data unit (PDU) session establishment.

In this embodiment of the present application, the receiving unit 410 is further configured to receive first indication information from a network device, where the first indication information includes the deployment-related slice information, and the first indication information is carried by at least one of: broadcast, a dedicated radio resource control (RRC) message, and a non-access stratum (NAS) message.

In this embodiment of the present application, the deployment-related slice information includes at least one of the following:
  slice identification;
  correspondence between a service and the slice;
  correspondence between a frequency band and the slice;
  correspondence between an application and the slice;
  correspondence between an operator or service provider identification and the slice;
  correspondence between a frequency point and the slice;
  slice deployment location information;
  a cell group or a tracking area (TA) corresponding to a same slice;
  a slice supported by this cell; and
  a slice supported by a neighboring cell.

In this embodiment of the present application, the slice identification includes at least one of: network slice selection assistance information (NSSAI), single network slice selection assistance information (S-NSSAI), and a network slice identification (NSID).

In this embodiment of the present application, the slice deployment location information includes at least one of the following:
  correspondence between a location and the slice;
  correspondence between coverage and the slice;
  deployment scope or coverage scope of the slice; and
  a deployment radius or a coverage radius of the slice. In this embodiment of the present application, the selection unit is configured to perform at least one of the following:
  based on a current location and slice deployment location information, selecting a slice that can be accessed, and determining at least one of: whether a first cell can be selected as a resident cell or a suitable cell, and whether to perform cell reselection;
  based on the current location, the slice deployment location information and a required slice, determining at least one of: whether the first cell can be selected as the resident cell or the suitable cell, and whether to perform the cell reselection;
  based on the required slice and correspondence between a frequency point and the slice, determining at least one of: the frequency point to be selected for residency or a cell corresponding to which frequency point to be selected, whether the first cell can be selected as the resident cell or the suitable cell, and whether to perform the cell reselection;
  based on the required slice and the correspondence between the frequency band and the slice, determining at least one of: the frequency band to be selected for residency or the cell corresponding to which frequency band to be selected, whether the first cell can be selected as the resident cell or the suitable cell, and whether to perform the cell reselection;
  based on required service and correspondence between the service and the slice, selecting the slice corresponding to the required service, and determining at least one of: whether the first cell can be selected as the resident cell or the suitable cell, and whether to perform the cell reselection;
  based on a required application and correspondence between the application and the slice, selecting the slice corresponding to the required application, and determining at least one of: whether the first cell can be selected as the resident cell or the suitable cell, and whether to perform the cell reselection;
  based on the required slice, the slice supported by this cell and the slice supported by a neighboring cell, determining at least one of: whether the first cell is selected as the resident cell or the suitable cell, and whether to perform the cell reselection; and
  based on the required slice, the correspondence between the operator or service provider identification and the slice, determining at least one of: a public land mobile network (PLMN) to be selected, whether the first cell can be selected as the resident cell or the suitable cell, and whether to perform the cell reselection.

In this embodiment of the present application, the receiving unit 410 is further configured to receive slice priority information and/or slice selection weight.

In this embodiment of the present application, the receiving unit 410 is further configured to receive second indication information from a network device, where the second indication information includes slice priority information and/or the slice selection weight, and the second indication information is carried by at least one of: broadcast, a dedicated RRC message, and a NAS message.

In this embodiment of the present application, the slice priority information corresponds to at least one of: information of a serving cell, information of other cells, information of a PLMN, and information of an operator or a service provider; or, the slice selection weight corresponds to at least one of: the information of the serving cell, the information of other cells, the information of the PLMN, and the information of the operator or service provider.

In this embodiment of the present application, the selection unit is further configured to select the slice based on the deployment-related slice information and slice priority information and/or slice selection weight from a network device.

In this embodiment of the present application, in a case where the network device supports multiple slices in a same deployment, the terminal device is further configured to select a preferred slice according to slice priority information or slice selection weight from a network device.

In the embodiment of the present application, the processing unit is further configured to report multiple required slices, so that a network device provides slicing services for the terminal device based on load, the slice priority information or the slice selection weight.

In the embodiment of the present application, the terminal device further includes:
  an obtaining unit 440, configured to obtain at least one of: slice priority information, slice selection weight, interest and preference of the terminal device.

In this embodiment of the present application, the receiving unit 410 is further configured to receive third indication information from a network device, where the third indication information is configured to indicate whether the terminal device is allowed to select the slice according to at least one of: slice priority information, slice selection weight, interest and preference of the terminal device, and the third indication information is carried by at least one of: broadcast, a dedicated RRC message, and a NAS message.

In this embodiment of the present application, the selection unit is further configured to determine, according to the third indication information, whether to select the slice according to at least one of: the slice priority information, the slice selection weight, the interest and the preference of the terminal device.

In this embodiment of the present application, at least one of the slice priority information, the slice selection weight, the interest and the preference of the terminal device is obtained by access stratum of the terminal device from non-access stratum of the terminal device, or is determined by the access stratum.

In this embodiment of the present application, the selection unit is further configured to select the slice based on the deployment-related slice information, slice priority information and/or slice selection weight from a network device, and at least one of the slice priority information, the slice selection weight, the interest and the preference of the terminal device.

In this embodiment of the present application, the selection unit is further configured to select a preferred slice according to the slice priority information of the terminal device, when determining, according to at least one of the slice priority information, the interest and the preference of the terminal device, that slice priority information from a network device is different from the slice priority information of the terminal device.

In this embodiment of the present application, the selection unit is further configured to select a preferred slice according to the slice selection weight of the terminal device, when determining, according to at least one of the slice priority information, the interest and the preference of the terminal device, that slice selection weight from a network device is different from the slice selection weight of the terminal device.

In this embodiment of the present application, the selection unit is further configured to select, in a case where the network device supports multiple slices in a same deployment, a preferred slice according to at least one of: the slice priority information, the slice selection weight, the interest and the preference of the terminal device.

In this embodiment of the present application, the processing unit is further configured to determine that whether the multiple slices are supported in the same deployment based on the deployment-related slice information.

The terminal device 400 in this embodiment of the present application can implement corresponding functions of the terminal device according to the above method embodiments. For the corresponding process, function, implementation, and beneficial effects of each module (sub-module, unit, or component, etc.) in the terminal device 400, please refer to the corresponding descriptions in the above method embodiments, which will not be repeated herein.

It should be noted that the function described about each module (sub-module, unit, or component, etc.) in the terminal device 400 of the embodiment of the present application may be implemented by different modules (sub-module, unit, or component, etc.), or may be implemented by the same module (sub-module, unit or component, etc.).

Figure 7:
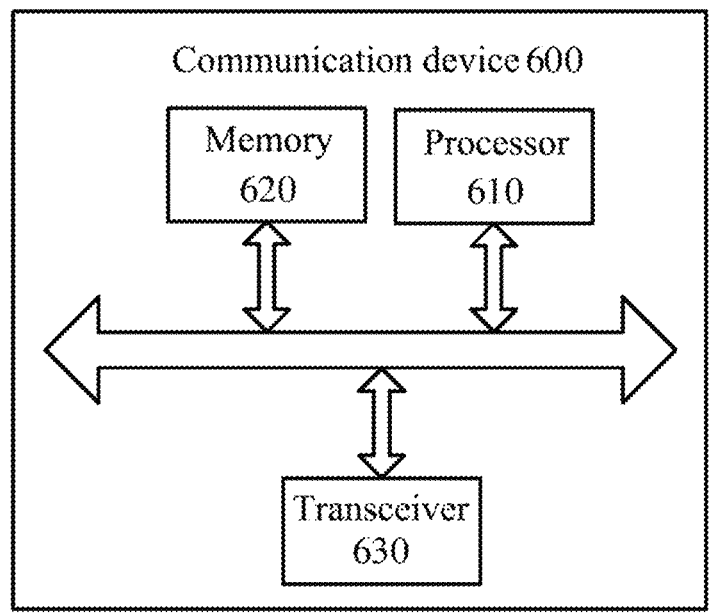
FIG. 7 is a schematic block diagram of a communication device according to an embodiment of the present application.

FIG. 7 is a schematic structural diagram of a communication device 600 according to an embodiment of the present application. The communication device 600 includes a processor 610, which can call and run a computer program from a memory, so that the communication device 600 implements the method according to the embodiments of the present application.

In an implementation, as shown in FIG. 7, the communication device 600 may further include a memory 620. The processor 610 may call and run the computer program from the memory 620, so that the communication device 600 implements the methods according to the embodiments of the present application.

The memory 620 may be a separate device independent of the processor 610, or may be integrated in the processor 610.

In an implementation, as shown in FIG. 7, the communication device 600 may further include a transceiver 630 which may be controlled by the processor 610 to communicate with other devices, specifically, may send information or data to other devices, or to receive information or data sent by other devices.

The transceiver 630 may include a transmitter and a receiver. The transceiver 630 may further include one or more antennas.

In an implementation, the communication device 600 may be a network device of the embodiment of the present application, and the communication device 600 may implement the corresponding processes implemented by the network device in each method of the embodiment of the present application, which will not be repeated herein for brevity.

In an implementation, the communication device 600 may be the terminal device of the embodiment of the present application, and the communication device 600 may implement the corresponding processes implemented by the terminal device in each method of the embodiment of the present application, which will not be repeated herein for brevity.

Figure 8:
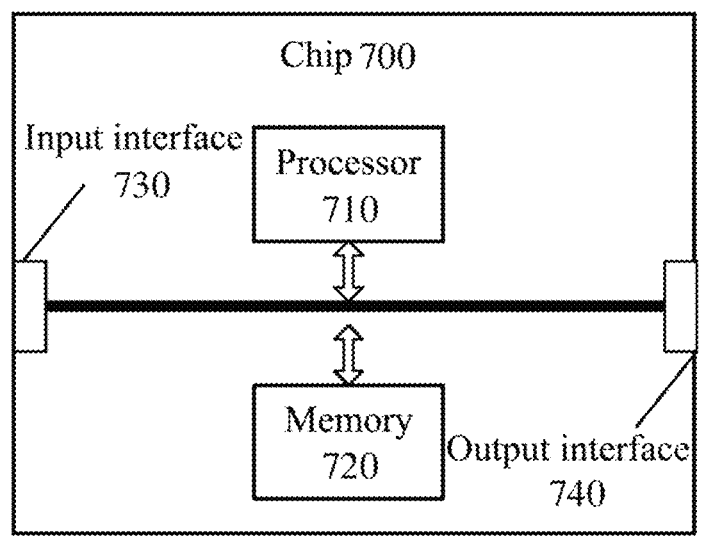
FIG. 8 is a schematic block diagram of a chip according to an embodiment of the present application.

FIG. 8 is a schematic structural diagram of a chip 700 according to an embodiment of the present application. The chip 700 includes a processor 710 which can call and run a computer program from a memory, so as to implement the methods according to the embodiments of the present application.

In an implementation, as shown in FIG. 8, the chip 700 may further include a memory 720, from which the processor 710 may call and run a computer program to implement the method performed by the terminal device or the network device in the embodiments of the present application.

The memory 720 may be a separate device independent of the processor 710, or may be integrated in the processor 710.

In an implementation, the chip 700 may further include an input interface 730, which may be controlled by the processor 710 to communicate with other devices or chips, and specifically, the input interface 730 may obtain information or data sent by other devices or chips.

In an implementation, the chip 700 may further include an output interface 740 which may be controlled by the processor 710 to communicate with other devices or chips, and specifically, the output interface 740 may output information or data to other devices or chips.

In an implementation, the chip may be applied to the network devices in the embodiments of the present application, and the chip may implement the corresponding processes implemented by the network device in each method of the embodiment of the present application, which will not be repeated herein for brevity.

In an implementation, the chip may be applied to the terminal devices in the embodiments of the present application, and the chip may implement the corresponding processes implemented by the terminal device in each method of the embodiment of the present application, which will not be repeated herein for brevity.

The chip applied to the network device and terminal device can be the same chip or different chips.

It should be understood that the chip mentioned in the embodiment of the present application may also be referred to as a system on a chip, a system chip, a chip system, or a system-on-chip, etc.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either a volatile memory or a non-volatile memory, or may include both the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (RAM).

It should be understood that the above memories are exemplary but not limiting, for example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM), a direct rambus random access memory (Direct Rambus RAM, DR RAM), etc. That is, the memory in the embodiment of the present application is intended to include, but is not limited to, these and any other suitable types of memories.

Figure 9:
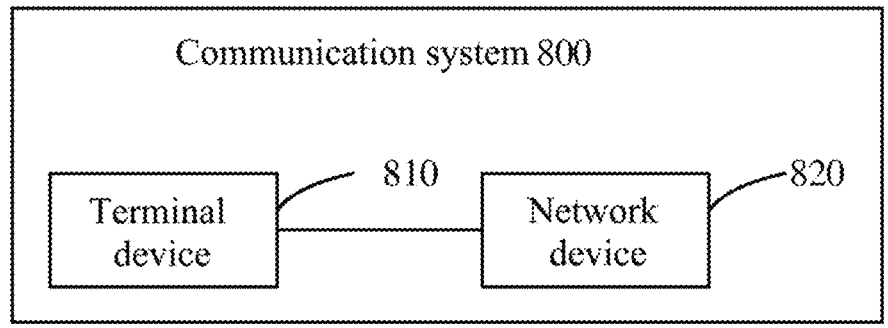
FIG. 9 is a schematic block diagram of a communication system according to an embodiment of the present application.

FIG. 9 is a schematic block diagram of a communication system 800 according to an embodiment of the present application. The communication system 800 includes a terminal device 810 and a network device 820.

The terminal device 810 is configured to receive deployment-related slice information; and select a slice based on the deployment-related slice information.

In an implementation, the network device 820 is configured to send the deployment-related slice information to the terminal device.

In an implementation, the network device 820 is further configured to send the slice priority information and/or slice selection weight to the terminal device.

In an implementation, the network device 820 is further configured to provide a slicing service for the terminal device 810, based on factors such as load, slice priority information, and slice selection weight.

The terminal device 810 may be used to implement the corresponding functions implemented by the terminal device in the above method, and the network device 820 may be used to implement the corresponding functions implemented by the network device in the above method, which will not be repeated herein for brevity.

In the above embodiments, it may be implemented in whole or in part by software, hardware, firmware or any combination thereof. In the case of being implemented by software, it can be implemented in whole or in part in the form of a computer program product. The computer program product includes one or more computer instructions. In the case the computer program instructions are loaded and executed on a computer, all or part of the processes or functions described in the embodiments of the present application are generated. The computer may be a general-purpose computer, a special-purpose computer, a computer network, or other programmable apparatuses. The computer instructions may be stored in a computer-readable storage medium or transmitted from one computer-readable storage medium to another computer-readable storage medium, for example, the computer instructions may be transmitted from a website site, a computer, a server or a data center, by wired way (for example, coaxial cable, optical fiber, digital subscriber line (DSL)) or wireless way (for example, infrared, wireless, microwave, etc.), to another website site, computer, server or data center. The computer-readable storage medium can be any available medium that can be accessed by a computer, or can be a data storage device containing an integrated server, data center, etc., integrated by one or more available media. The available medium may be magnetic medium (for example, a floppy disk, a hard disk, a magnetic tape), an optical medium (for example, a DVD), or a semiconductor medium (for example, a solid state disk (SSD)), etc.

It should be understood that, in the embodiments of the present application, the sequence numbers of the above processes does not indicate the execution order. The execution order of each process should be determined by its functions and internal logic, and should not constitute any limitation onto the implementation processes of the embodiments of the present application.

Those skilled in the art can clearly understand that, for the convenience and brevity of the description, the specific working process of the above systems, apparatuses and units may refer to the corresponding processes in the above method embodiments, which will not be repeated herein.

The above are only specific implementations of the present application, but the scope of protection of the present application is not limited thereto. Changes or Substitutions can be easily thought of by any person of ordinary skill in the art within the technical scope disclosed in the present application should be covered in the scope of protection of the present application. Therefore, the scope of protection of the present application shall be subject to the scope of protection of the claims.

What is claimed is:

1. A slice selection method, comprising:
   receiving, by a terminal device, deployment-related slice information; and
   selecting, by the terminal device, a slice based on the deployment-related slice information;
   wherein the deployment-related slice information comprises at least one of the following:
   slice identification;
   correspondence between a service and the slice;
   correspondence between a frequency band and the slice;
   correspondence between an application and the slice;
   correspondence between an operator or service provider identification and the slice;
   correspondence between a frequency point and the slice;
   slice deployment location information;
   a cell group or a tracking area (TA) corresponding to a same slice;
   a slice supported by this cell; and
   a slice supported by a neighboring cell.

2. A terminal device, comprising:
   a processor;
   a communication interface connected with the processor; and
   a memory storing instructions and connected with the processor; wherein
   the instructions, when executed by the processor, cause the processor to:
   receive, through the communication interface, deployment-related slice information; and
   select a slice based on the deployment-related slice information;
   wherein the deployment-related slice information comprises at least one of the following:
   slice identification;
   correspondence between a service and the slice;
   correspondence between a frequency band and the slice;
   correspondence between an application and the slice;
   correspondence between an operator or service provider identification and the slice;
   correspondence between a frequency point and the slice;
   slice deployment location information;
   a cell group or a tracking area (TA) corresponding to a same slice;
   a slice supported by this cell; and
   a slice supported by a neighboring cell.

3. The terminal device according to claim 2, wherein the instructions further cause the processor to:
   perform, based on a selected slice, at least one of reporting of a required slice, residency, cell selection, cell reselection and protocol data unit (PDU) session establishment.

4. The terminal device according to claim 2, wherein the instructions further cause the processor to:
   receive, through the communication interface, first indication information from a network device, wherein the first indication information comprises the deployment-related slice information, and the first indication information is carried by at least one of: broadcast, a dedicated radio resource control (RRC) message, and a non-access stratum (NAS) message.

5. The terminal device according to claim 2, wherein the slice identification comprises at least one of: network slice selection assistance information (NSSAI), single network slice selection assistance information (S-NSSAI), and a network slice identification (NSID).

6. The terminal device according to claim 2, wherein the slice deployment location information comprises at least one of the following:
   correspondence between a location and the slice;
   correspondence between coverage and the slice;
   deployment scope or coverage scope of the slice; and
   a deployment radius or a coverage radius of the slice.

7. The terminal device according to claim 2, wherein the instructions further cause the processor to perform at least one of the following:
   based on a current location and the slice deployment location information, selecting a slice that can be accessed, and determining at least one of: a slice that can be selected or reported, whether a first cell can be selected as a resident cell or a suitable cell, and whether to perform cell reselection;
   based on the current location, the slice deployment location information and a required slice, determining at least one of: the slice that can be selected or reported, whether the first cell can be selected as the resident cell or the suitable cell, and whether to perform the cell reselection;
   based on the required slice and correspondence between a frequency point and the slice, determining at least one of: the slice that can be selected or reported, the frequency point to be selected for residency or a cell corresponding to which frequency point to be selected, whether the first cell can be selected as the resident cell or the suitable cell, and whether to perform the cell reselection;
   based on the required slice and the correspondence between the frequency band and the slice, determining at least one of: the slice that can be selected or reported, the frequency band to be selected for residency or the cell corresponding to which frequency band to be selected, whether the first cell can be selected as the resident cell or the suitable cell, and whether to perform the cell reselection;
   based on required service and correspondence between the service and the slice, selecting the slice corresponding to the required service, and determining at least one of: the slice that can be selected or reported, whether the first cell can be selected as the resident cell or the suitable cell, and whether to perform the cell reselection;
   based on a required application and correspondence between the application and the slice, selecting the slice corresponding to the required application, and determining at least one of: the slice that can be selected or reported, whether the first cell can be selected as the resident cell or the suitable cell, and whether to perform the cell reselection;
based on the required slice, the slice supported by this cell and the slice supported by a neighboring cell, determining at least one of: the slice that can be selected or reported, whether the first cell is selected as the resident cell or the suitable cell, and whether to perform the cell reselection; and
based on the required slice, the correspondence between the operator or service provider identification and the slice, determining at least one of: the slice that can be selected or reported, a public land mobile network (PLMN) to be selected, whether the first cell can be selected as the resident cell or the suitable cell, and whether to perform the cell reselection.

8. The terminal device according to claim 2, wherein the instructions further cause the processor to:
receive, through the communication interface, slice priority information and/or slice selection weight.

9. The terminal device according to claim 8, wherein the instructions further cause the processor to:
receive, through the communication interface, second indication information from a network device, wherein the second indication information comprises the slice priority information and/or the slice selection weight, and the second indication information is carried by at least one of: broadcast, a dedicated RRC message, and a NAS message.

10. The terminal device according to claim 8, wherein the slice priority information corresponds to at least one of: information of a serving cell, information of other cells, information of a PLMN, and information of an operator or a service provider; or, the slice selection weight corresponds to at least one of: the information of the serving cell, the information of other cells, the information of the PLMN, and the information of the operator or service provider.

11. The terminal device according to claim 8, wherein the instructions further cause the processor to:
select the slice based on the deployment-related slice information and slice priority information and/or slice selection weight from a network device.

12. The terminal device according to claim 8, wherein, in a case where the network device supports multiple slices in a same deployment, the instructions further cause the processor to:
select a preferred slice according to slice priority information or slice selection weight from a network device.

13. The terminal device according to claim 8, wherein the instructions further cause the processor to:
report multiple required slices, such that a network device provides slicing services for the terminal device based on load, the slice priority information or the slice selection weight.

14. The terminal device according to claim 2, wherein the instructions further cause the processor to:
obtain at least one of: slice priority information, slice selection weight, interest and preference of the terminal device.

15. The terminal device according to claim 2, wherein the instructions further cause the processor to:
receive, through the communication interface, third indication information from a network device, wherein the third indication information is configured to indicate whether the terminal device is allowed to select the slice according to at least one of: slice priority information, slice selection weight, interest and preference of the terminal device, and the third indication information is carried by at least one of: broadcast, a dedicated RRC message, and a NAS message.

16. The terminal device according to claim 15, wherein the instructions further cause the processor to:
determine, according to the third indication information, that whether to select the slice according to at least one of: the slice priority information, the slice selection weight, the interest and the preference of the terminal device.

17. The terminal device according to claim 14, wherein at least one of the slice priority information, the slice selection weight, the interest and the preference of the terminal device is obtained by access stratum of the terminal device from non-access stratum of the terminal device, or is determined by the access stratum.

18. The terminal device according to claim 14, wherein the instructions further cause the processor to:
select the slice based on the deployment-related slice information, slice priority information and/or slice selection weight from a network device, and at least one of the slice priority information, the slice selection weight, the interest and the preference of the terminal device.

19. The terminal device according to claim 14, wherein the instructions further cause the processor to:
select a preferred slice according to the slice priority information of the terminal device, when determining, according to at least one of the slice priority information, the interest and the preference of the terminal device, that slice priority information from a network device is different from the slice priority information of the terminal device.

20. The terminal device according to claim 14, wherein the instructions further cause the processor to:
select a preferred slice according to the slice selection weight of the terminal device, when determining, according to at least one of the slice priority information, the interest and the preference of the terminal device, that slice selection weight from a network device is different from the slice selection weight of the terminal device.

21. The terminal device according to claim 14, wherein the instructions further cause the processor to:
select, in a case where the network device supports multiple slices in a same deployment, a preferred slice according to at least one of: the slice priority information, the slice selection weight, the interest and the preference of the terminal device.

22. The terminal device according to claim 12, wherein the instructions further cause the processor to:
determine that whether the multiple slices are supported in the same deployment based on the deployment-related slice information.

* * * * *